United States Patent Office 3,366,468
Patented Jan. 30, 1968

3,366,468
METHOD OF DESENSITIZING FERTILIZER GRADE AMMONIUM NITRATE AND THE PRODUCT OBTAINED
Samuel J. Porter, 6800 N. 31st St., Arlington, Va. 22213
No Drawing. Filed Feb. 10, 1965, Ser. No. 431,713
3 Claims. (Cl. 71—35)

ABSTRACT OF THE DISCLOSURE

This invention relates to a method of rendering fertilizer grade ammonium nitrate resistant to flame and insensitive to detonation by adding thereto 5 to 10% of an ammonium phosphate or a mixture thereof with potassium chloride or ammonium sulfate. The product obtained is an integral, intimate and uniform mixture of the ingredients and is highly ressitant to flame and insensitive to detonation.

This invention relates to desensitized ammonium nitrate fertilizer of lowered flammability and sensitivity to explosive detonation and to methods for manufacturing the same.

Recent years have seen an enormous expansion in the production of ammonium nitrate (AN) and, particularly, fertilizer grade ammonium nitrate (FGAN). Its significant role in agriculture has resulted in such a demand that several million tons are produced annually in the United States. While the widespread use of large tonnage of ammonium nitrate in farming has been accomplished without unfavorable incident, there have been, during the last twenty years, several extremely serious explosions which have involved ammonium nitrate during its manufacture, shipment, and storage. These explosions have been widely publicized and described in the technical literature and the lay press. The most famous is that which occurred in the harbor of Texas City, Tex., in 1947 in which two ship loads of fertilizer grade ammonium nitrate caught fire and detonated. The amount of ammonium nitrate involved was some seven million pounds and the damage created was extremely severe. There was also great loss of life (over 500 people killed and some 3,000 injured). Similar explosions in recent years with shiploads of fertilizer grade ammonium nitrate have occurred in Brest, France, and in the Black Sea.

In all these cases the detonation of the ammonium nitrate was preceded by fire. It is, therefore, clear that fertilizer grade ammonium nitrate in large quantity can detonate explosively with great hazard, particularly if subject to fire.

It would appear that some confinement is required for a true detonation to be obtained. Further, it is likely that a certain amount of organic material greatly increases the sensitivity to detonation. A recent study by Burns et al. (J. J. Burns et al., U.S. Bureau of Mines, R.I. 4994 (1953), 19 pages; and Chemical Abstracts 47, 11736 (1953)) shows that pure ammonium nitrate at melting point 169° C. will detonate between 277 to 344° C. If 1.5% organic material, in the form of bagging paper, is added to the ammonium nitrate, the temperature of explosion falls to 134 to 153° C. Study of the Texas City and other disasters involving ammonium nitrate indicate that bagging paper or other organic material was usually present, as well as some degree of confinement. For example, in the Texas City case, the ammonium nitrate was confined in the holds of ships.

This sensitivity to detonation from fire has been well recognized. In 1945 Davis emphasized that ammonium nitrate constituted a fire hazard and observed that under the right conditions of pressure and confinement ammonium nitrate might be exploded at a temperature as low as 300° C. (R. O. E. Davis, U.S. Department of Agriculture Circular No. 719 (1945), 22 pages.) Ammonium nitrate has also been stated to be "capable of undergoing detonation at elevated temperatures under certain conditions of confinement, or shock. Organic and other readily oxidizable matter can sensitize it to a more readily explodable state." (Page 21, Bulletin 49 M, Hazardous Chemicals Data 1963, National Fire Protection Association, Boston, Mass.)

Since the Texas City and Brest disasters, a gread deal of work has been done on the study of flammability and subsequent detonation of ammonium nitrate. It is now quite firmly established that ammonium nitrate may be exploded by heat alone. In the Encyclopedia of Explosives and Related Items, by Fedoroff et al., Picatinny Arsenal, Dover, N.J. (1960), page A362, it is stated, "It is now known that ammonium nitrate and mixtures of it with organic materials and even ammonium sulphate can be caused to detonate by heating under conditions of confinement."

It is, of course, important to realize that an ammonium nitrate fire which does not proceed to detonation is still an extremely hazardous occurrence and instances of great damage by fire alone in the case of the burning of ammonium nitrate and organic material are well known. An example is the Oct. 19, 1949, disaster in which an ammonium nitrate warehouse containing 1400 tons of the fertilizer grade ammonium nitrate burned to the ground with loss of $325,000.

It is further well known that ammonium nitrate can be detonated or exploded when set off by detonator or detonator-booster combination. While pure ammonium nitrate can only be exploded by a detonator or blasting cap when quite heavily confined, it is well known that ammonium nitrate mixed with organic fuel such as fuel oil is readily detonated. This latter combination is the basis for the widely used blasting agents in mining, quarrying, road building, etc. In such cases, ammonium nitrate is mixed with about 6% fuel oil and in the confinement of a drill hole can be readily exploded by a dynamite charge or some other high explosive booster. Very grave accidents involving both pure ammonium nitrate and ammonium nitrate mixed with fuel, when subject to detonating shock have been reported. The largest of these occurred at Oppau, Germany, in 1921 when nine million pounds of ammonium nitrate detonated while being blasted with dynamite. This enormous explosion took the lives of 1100 people, with 1500 being injured.

However, the mechanism whereby most of the disastrous ammonium nitrate explosions occur has been generally interpreted to be one in which a fire is involved. Such mechanism is as follows: A fire starts; heat is evolved; and the ammonium nitrate present begins to decompose. Its decomposition products, which include nitrogen oxides, accelerate the progress of the fire. As the fire becomes progressively more vigorous, the temperature rises rapidly until it becomes so high that the ammonium nitrate decomposition becomes explosive.

It is therefore an object of the present invention to overcome the disadvantages and dangers of the prior art, such as indicated above.

It is another object of the present invention to provide simple and inexpensive procedures for the manufacture of desensitized ammonium nitrate fertilizer.

It is another object of the present invention to provide inexpensive, effective and safe ammonium nitrate fertilizer.

It is another object of this invention to describe a composition of ammonium nitrate with certain other chemicals which make it less flammable and consequently less subject to detonation, either "per se" or in the presence of organic materials.

It is a further object of this invention to describe methods for the addition of certain chemicals to ammonium nitrate during its manufacture, so that the resultant product will have increased flame-resistance and increased insensitivity to detonation.

It is yet another object of this invention to describe the application of certain chemicals to ammonium nitrate already prepared by various processes such that the ammonium nitrate, thus treated, will be increased in resistance to flange and to detonation.

Additional objects of this invention will become apparent as this invention is more fully defined.

Other objects and the nature and advantages of the instant invention will be apparent from the following description.

It has now been discovered that these hazardous characteristics of fertilizer grade ammonium nitrate can be minimized while at the same time the use of the ammonium nitrate as a fertilizer will not only not be hampered, but will in fact be enhanced. Thus, the present invention concerns the achievement of lowering the flammability and detonability of ammonium nitrate by the addition primarily of ammonium phosphates to the ammonium nitrate although mixtures of potassium chloride with ammonium phosphates can also be used.

It is well known that ammonium phosphate is a fire-retardant material. It is also well recognized that this material is an important constituent of fertilizers. In fact, this material is often added to ammonium nitrate at the time that it is being applied to the soil as a fertilizer. It is also, upon occasion, added to ammonium nitrate in various concentrations in the dry form to give a mixture which is bagged and sold as mixed fertilizer. However, the present invention concerns itself with the ammonium nitrate as it is manufactured, handled, stored and shipped in large quantity prior to its mixture with other fertilizer type materials for application in agriculture.

This invention concerns the addition of an ammonium phosphate in controlled quantities into the ammonium nitrate manufacturing processes so that the ammonium nitrate product will contain a fixed amount of the ammonium phosphate distributed uniformly throughout the crystalline structure of the solid ammonium nitrate, and so intimately bonded to it, or confined within it, that it will not settle out, shake down, or otherwise separate during subsequent handling, shipment and storage. Several methods are provided whereby this addition of an ammonium phosphate to the ammonium nitrate will be accomplished. By an ammonium phosphate it is meant any one chemical or combination of chemicals from the following lists: ammonium phosphate, $NH_4H_2PO_4$; diammonium phosphate, $(NH_4)_2HPO_4$; ammonium polyphosphate, $(NH_4)$ salt of

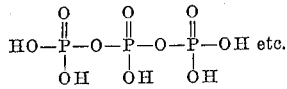

ammonium pyrophosphate, $(NH_4)_2H_2P_2O_7$; and ammonium metaphosphate, $NH_4PO_3$.

It has been found in accordance with the present invention that the ammonium phosphate must be present in the ammonium nitrate in proportions of from about 1% to about 15% by weight, and preferably from about 5% to about 10%. At less than about 1% ammonium phosphate, very little if any improvement in the desensitization of the ammonium nitrate occurs. From 1% to 5% the desensitiziation improves constantly from slight desensitization to good desensitization. Between 5% and 10% of ammonium phosphate, the degree of desensitization is high, and the ammonium nitrate fertilizer is both highly effective and adequately safe. Above 10% by weight of ammonium phosphate the desensitization of the ammonium nitrate does not improve and the fertilizer becomes increasingly diluted with ammonium phosphate (which is undesirable for the nitrate fertilizer).

Instead of utilizing only an ammonium phosphate as the additive, minor proportions of potassium chloride or ammonium sulfate may also be used. Thus, in place of 15% of an ammonium phosphate (or mixtures of various ammonium phosphates) a mixture of 10% ammonium phosphate and 5% potassium chloride or ammonium sulfate may also be used. Potassium chloride or ammonium sulfate should not be used with less than 5% ammonium phosphate and should, in general, constitute not more than about 35% of the additive.

Ammonium nitrate is frequently used as fertilizer without the admixture of other fertilizer ingredients, which, though generally valuable in their fertilizing action, will nevertheless lower the average nitrogen content of the total mixture. It is desirable, if the modified ammonium nitrate proposed in this invention is to be available for such use, that its nitrogen content be as close to that of ammonium nitrate, i.e. 35%, as possible. For this reason, the amount of additive prescribed should be kept below 15% by weight. As indicated above, amounts of additive less than 1% appear to have little or no effect on flammability or detonability of ammonium nitrate—and are, as well, hard to add in a manner such that they are uniformly distributed; also, there appears to be no significant decrease in flammability or detonability obtained adding more than 15% of an additive. In this regard data obtained show that a sample of ammonium nitrate containing 15% ammonium phosphate in one case, and 20% in another are both totally inert when attempts to detonate them were made.

The decrease in flammability and detonability obtained in going from 10% additive to 15% is only slight. Generally speaking ammonium nitrate containing 10% additive is totally insensitive to detonation shock and very difficult to cause to burn even under intense heating with direct flames. As will appear below from the examples, 5% additive would appear satisfactory in terms of most of the conditions of handling, shipment, and storage to which ammonium nitrate is subjected, and even 1% appears to have a measurable though slight effect.

An important feature of this invention is the integral nature of the bonding between the ammonium phosphate and the ammonium nitrate. This is accomplished by development of a liquid phase at some time during the mixture of the components. Since the ammonium nitrate and the ammonium phosphate (as well as potassium chloride) are all water soluble, dissolving or even suspending one or all of the constituents in water is a means of establishing a liquid phase in which the ammonium phosphate and the ammonium nitrate can be uniformly mixed and from which crystalline ammonium nitrate can be obtained containing the additive integrally and uniformly bound thereto, for example in its crystal lattice—or otherwise integrally bound. Another means for obtaining a liquid phase is to take advantage of the low melting point of ammonium nitrate; thus, molten ammonium nitrate can act as a liquid phase to which dry, solid ammonium phosphate can be added. The ammonium phosphates are all soluble in liquid ammonium nitrate and can be added, stirred or otherwise mixed therewith after which, on cooling, solid ammonium nitrate containing the additive or additives will be obtained.

One method of providing desensitized ammonium nitrate fertilizer involves the addition of from one to fifteen percent of an ammonium phosphate to a concentrated ammonium nitrate solution just prior to its crystallization in either (1) the prilling process or (2) the various crystallization processes for the manufacture of ammonium nitrate. These processes are based upon the neutralization of ammonia by nitric acid with the formation of a concentrated solution of ammonium nitrate and the manufacture of ammonium nitrate fertilizer per se by such processes is well known.

In the prilling process a highly concentrated solution of ammonium nitrate (95 to 99%) is sprayed from the top center of the inside of a prilling tower against an upward stream of warm air. As the concentrated solution of ammonium nitrate falls downwardly to the bottom of the tower, the droplets into which the concentrated solution divides crystallize into roughly spherical, slightly moist prills. In accordance with the present invention 1 to 15% of an ammonium phosphate is added to this concentrated solution prior to the point at which it is sprayed downward from the spray nozzles. It has been determined that the addition of the ammonium phosphate (or mixture with potassium chloride) to the concentrated ammonium nitrate solution will not cause any crystallization prior to prilling and, further, that, when the prills are formed, they will contain uniformly and integrally distributed in them essentially the same percentage of the additive ammonium phosphate that was added to the concentrated ammonium nitrate solution.

Industrial practice for the making of prilled ammonium nitrate involves the evaporation of ammonium nitrate solution, which results from the reaction of nitric acid and ammonia, to a concentration of about 95%. This solution, at a temperature of about 140° C., is then pumped to the top of the prill tower and sprayed downward to form prills. The ammonium phosphate may be added to the ammonium nitrate solution during the concentration process, or at any point convenient to the plant layout thereafter which is prior to the actual spraying step. As indicated above, ammonium phosphate has been found to be readily soluble in hot ammonium nitrate solutions of high concentration and when added in solid form and dissolved, no immediate precipitation or crystallization occurs. On this basis, it has been determined that these materials may be added, in the proportions desired, to the ammonium nitrate solution either as solids or in concentrated aqueous solution, depending on the convenience of the plant design. Under such circumstances, when the ammonium nitrate solution containing the additive is sprayed through the prilling nozzle, the dissolved solids crystallize very rapidly in the droplets of moisture that wall downward. The ammonium phosphate under such circumstance tends to distribute itself uniformly within the crystal structure of the prill, in such an intimate fashion that it is fixed within the prill matrix permanently thereafter. It is likely that some co-crystallization occurs. In any event, the prill, thus formed, contains uniformly and permanently distributed throughout its structure essentially the same percentage of the ammonium phosphate which was added to the melt.

Variation in chemical composition and structure of the additive material after its integration with the ammonium nitrate has been observed. This can readily be ascribed to the known behavior of these additives. For example, diammonium phosphate exhibits an appreciable vapor pressure of ammonia at temperatures from 100° C. up. Hence when added to the concentrated ammonium nitrate solution at 140° C. some partial dissociation occurs. As a result the final prill formed from this operation will contain in its crystal lattice not only diammonium phosphate but some mono-ammonium phosphate as well. In the case where the ammonium salt of polyphosphoric acid is utilized as the additive, partial reversion of this material from the poly-form to the standard mono-ortho form will be noted. Hence the resulting ammonium nitrate crystal will have in its immediate structure not only ammonium polyphosphate but some mono and diammonium ortho phosphates as well.

In the crystallization process for the preparation of ammonium nitrate, the method of manufacture is based upon cooling a saturated solution of ammonium nitrate under vacuum. The crystals, which are formed, produce a slurry which is centrifuged to remove them from solution. These crystals are then dried in a heating system and coated with clay to prevent caking. In this process, as in the prilling process, solid ammonium phosphate may be added to the saturated ammonium nitrate solution before insertion into the vacuum crystallizer, or a saturated solution of ammonium phosphate may be added. Upon cooling, the crystals obtained from the solution retain the ammonium phosphate in approximately the same percentage in which they are added to the solution. Thus, the same effect is obtained as in prilling, and again the additive appears to be co-crystallized with the ammonium nitrate, or in some other way integrally held within the crystal lattice in a permanent fashion which is resistant to any separation other than by redissolving or melting. Since fires sometimes occur during the drying of ammonium nitrate crystals or in the concentration of ammonium nitrate solutions, it would appear the presence of ammonium phosphate in ammonium nitrate at these manufacturing stages would have a valuable effect during the manufacturing process as well as thereafter.

In the Stengel process for the preparation of ammonium nitrate, the neutralization of superheated ammonia at about 145° C. with 60% nitric acid (at 165 to 170° C.) takes place in a packed, stainless steel vessel. The heat of reaction between the ammonia and the nitric acid, as well as air blown through the products, controls the moisture content to almost any level desired and the molten ammonium nitrate and water vapor leave the reactor at 200° C. The ammonium phosphate may be added in this process to the molten ammonium nitrate just prior to the point at which it flows to the bottom of the reactor and before it is cooled on a steel belt chiller, fragmented, coated and bagged. Again the additives may be either solid or in concentrated aqueous solution. In view of some plant-design considerations, it may not always be convenient, or even possible, to add ammonium phosphate to the ammonium nitrate during the manufacturing process. This invention, therefore, considers the addition of these materials to ammonium nitrate after it has been prepared as follows:

A highly concentrated hot aqueous solution of ammonium phosphate may be sprayed onto a moving belt of ammonium nitrate crystals or prills, the spraying being adjusted so that the average proportionate concentration of additive is maintained.

A further method is to place ammonium nitrate into a mixer and moisten it slightly, add the dry additive and mix thoroughly, then dry by heating to drive off the moisture and to strengthen the bond between the additive and the ammonium nitrate.

A further method comprises dissolving ammonium nitrate in a minimum amount of water, heating the solution to approximately 95% concentration and adding dry ammonium phosphate in proper proportion. This solution is then cooled on a vacuum and the slurry of crystals which forms is centrifuged, and separated, then dried by heating.

A further method involves melting ammonium nitrate on a moving hot belt and spraying the surface of the ammonium nitrate on the moving belt with a concentrated solution of ammonium phosphate; or adding the ammonium phosphate in the form of a powder which is blown onto the molten ammonium nitrate by an air stream. In order to point out more fully the nature of the present invention, the following specific examples are given of illustrative methods for compounding ammonium nitrate additive compositions.

EXAMPLE I

In a large glass beaker containing 100 grams of water, 840 grams of ammonium nitrate ($NH_4NO_3$) were added, with stirring and heating. At 100° C. the ammonium nitrate was completely dissolved to form a solution of approximately 93% concentration. To this hot solution was then added 84 grams of diammonium phosphate $(NH_4)_2HPO_4$ with stirring. An odor of ammonia was observed, indicating the formation of some mono-ammonium phosphate $(NH_4H_2PO_4)$. Heating was continued with subsequent loss of water until crystallization began. The solution was then cooled at room temperature and then in a refrigerator at 0° C. at which point the beaker contained a solid mass of crystals. This mass was removed and crushed by a mortar and pestle and dried on glass plates in an oven at 140° C. for ten hours. The weight of the dried material was 928 grams indicating a moisture content of about 6 grams of water or about .5%. This percentage moisture corresponds to that found in ammonium nitrate prepared by the prilling process.

EXAMPLE II

A slurry of 35 grams of potassium chloride in 20 grams of water at 20° C. was added to a beaker containing 350 grams of dry ammonium nitrate. Some solution of the ammonium nitrate occurred. The resultant moist mixture was thoroughly stirred for 15 minutes and then placed in an oven and dried on a glass plate for approximately 14 hours at 140° C.

EXAMPLE III

Detonation sensitivity tests and flammability tests

Prills prepared in the fashion described above in accordance with the present invention have been tested experimentally to determine their flammability and susceptibility to detonation in comparison with prilled ammonium nitrate prepared without such treatment. Experiments conducted on ammonium nitrate containing approximately 10% diammonium phosphate (DAP) showed that when the substance was mixed with 10% organic fuel and a Bunsen burner flame applied, it would burn in a regular fashion. However, once the flame is withdrawn, further burning ceased. This was not the case with a mixture of untreated ammonium nitrate with 10% organic matter when exposed to the same conditions. In this latter case, the fire began in the mixture when the Bunsen burner flame was applied and continued in an accelerating manner after the withdrawal of the Bunsen burner flame. The ability of ammonium nitrate to sustain burning was thus negated by this treatment.

Detonation sensitivity tests

Since ammonium nitrate without organic matter is relatively difficult to detonate, a more rigorous test was provided by mixing the AN with 5.5% of No. 2 diesel fuel oil thus achieving an approximately oxygen balanced mixture. In all detonation tests therefore, whether with ammonium nitrate or any of the ammonium nitrate-ammonium phosphate combinations, the product under test contained 5.5% of No. 2 diesel fuel oil incorporated as a homogeneous mixture.

In order that particle size distribution should be uniform the chemicals, regardless of method of preparation, were screened and blended before the addition of oil to the following specification:

| Tyler Screen No.: | Percentage |
|---|---|
| On No. 14 | 20±2 |
| On No. 35 | 50±2 |
| Through No. 35 | 30±2 |

The mixtures to be tested were placed in two-quart ice-cream or food containers approximately 4" in diameter and 10" long that contained approximately 3 pounds of AN/FO. Covers were applied and taped in place with friction tape.

Two types of conventional initiators were used. One was a standard No. 8 blasting cap. The other was fabricated from Ensign Bickford 50-grain per foot Primacord. 12 2" sections of 50-grain Primacord were placed concentrically around a No. 8 blasting cap and taped securely to the blasting cap with Scotch tape. The assembled unit was wrapped in Saran wrap for waterproofing. This initiator, in addition to the blasting cap, thus contained approximately 100 grains of pentaerythritol tetranitrate (PETN). The initiator was inserted in the top end of the charge just under the cover. The lead wires of the blasting cap were brought out through a small hole in the cover and taped securely on both sides of the cover to prevent movement.

The charge with initiator in position was placed horizontally on soft sand. A conventional 15-foot Primacord "Tell-Tale" was inserted to give evidence of detonation or failure. One end of the Primacord was tied securely to a metal stake. The other end, with a No. 6 non-electric blasting cap crimped in place, was inserted into the charge through a small hole ½" from the bottom of the charge. The Primacord between charge and stake was carefully buried about 3" in sand. Initiation of the Primacord indicated that detonation had proceeded throughout the entire charge. A 10-shot electric blasting machine was used to detonate the initiators.

The results of these tests using a series of 20 experiments for each example are summarized in the following table.

SUMMARY.—DETONATION SENSITIVITY

| Series of Example | Initiator | | |
|---|---|---|---|
| | Product | No. 8 Blasting Cap | Primacord 100 Grains |
| IV | 5.5% F.O.+A.N. | 10 of 10 H.O. | 10 of 10 H.O. |
| V | 5.5% F.O.+ANP (1%) | 9 L.O., 1 N.D. | 10 of 10 L.O. |
| VI | 5.5% F.O.+ANP (5%) | 6 L.O., 4 N.D. | 9 L.O., 1 N.D. |
| VII | 5.5% F.O.+ANP (10%) | 10 of 10 N.D. | 10 of 10 N.D. |
| VIII | 5.5% F.O.+ANP (15%) | 10 of 10 N.D. | 10 of 10 N.D. |

H.O.=High Order detonation. L.O.=Low Order detonation. N.D.=No detonation. F.O.=No. 2 Diesel Fuel Oil. AN=Ammonium Nitrate. ANP (x%)=Desensitized AN with (x%) denoting percent of Additive and P denoting Ammonium Phosphate.

EXAMPLE IX

Using the procedure of Examples IV–VIII five experiments were run utilizing 10% potassium chloride as the additive for the AN. In all five experiments, no detonation occurred.

EXAMPLE X

Using the procedure of Examples IV–VIII another five experiments were run this time utilizing 10% ammonium sulfate as the additive for the AN. No detonation occurred in any of the runs.

EXAMPLE XI

Flammability tests

As in Examples IV–VIII, the fertilizer products were ground and blended to the same particle size distribution. This eliminates the variables caused by method of fertilizer manufacture and makes the test more rigorous. Unless indicated, the fertilizer material under test was blended with finely divided charcoal. Three parts AN fertilizer with one part charcoal.

A bed of glowing charcoal was chosen as the ignition source in preference to an oxy-acetylene flame. Molten AN from the test sample was absorbed by the glowing charcoal in much the same manner as would occur in an actual AN fire.

A basket of 16 mesh steel wire 2½" in diameter and 1½" in depth was filled with the sample to be tested and placed on a glowing bed of charcoal. Warm air from a nozzle 1" in diameter was directed at the base of the basket with the nozzle positioned at a distance of 4" from the base. The air stream was continued until flames developed in the sample at which time the basket was removed and the sample allowed to burn. In the case of total fume-off without flaming, air was maintained until the end.

*Test A.*—The composition was prepared by adding 10% DAP to AN in aqueous solution and the product was crystallized out and dried at 200° F. for 3 hours. As a control AN with no charcoal resulted in fuming off. When 10% ammonium phosphate was added to the AN with no charcoal each test resulted in fuming off with greater difficulty than in the control.

When the AN contained charcoal in the proportion of 3 parts AN to 1 part charcoal the test resulted in burning in 14 out of 14 runs. When 10% ammonium phosphate was added to the 3 AN:1 C fuming only was obtained with no burning in 14 out of 14 runs.

When 6% fuel oil was added to the 3 AN:1 C burning resulted and the burning continued even when it was removed from the externally supplied heat in 6 out of 6 runs. When 6% fuel oil was added to the 3 AN:1 C containing 10% ammonium phosphate burning took place in 7 out of 7 runs; however, the burning ceased when it was removed from the externally supplied heat.

*Test B.*—The composition was prepared by melting AN at 350° F. 10% DAP was added at 350° for 5 minutes and the mixture was cast in thin sheet and ground.

In 10 runs (5 AN controls and 5 ANP (10%)) there was burning in the 5 controls; however, in the ANP (10%) samples there was only fuming.

*Test C.*—The composition was prepared as in Test B but with 5% DAP added.

In 10 runs (5 AN controls and 5 ANP (5%)) there was burning in each of the 5 controls. In the ANP (5%) however there was only fuming.

*Test D.*—The composition was prepared as in Test B but with 15% DAP added.

In 10 runs (5 AN controls and 5 ANP (15%)) there was burning in each of the 5 controls. In the ANP (15%) however there was only fuming.

*Test E.*—The composition was prepared as in Test B but with 20% DAP added.

In 10 runs (5 AN controls and 5 ANP (20%)) there was burning in each of the 5 controls. In the ANP (20%) however there was only fuming.

*Test F.*—The composition was prepared as in Test B but with 1% DAP added.

In 10 runs (5 AN controls and 5 ANP (1%)) there was burning in each of the 5 controls. In the 5 samples of ANP (1%) there was burning but it was markedly more difficult to ignite and it burned less vigorously.

*Test G.*—The composition was prepared as in Test B but with 10% KCl added in place of the DAP. In 10 runs (5 AN controls and 5 AN+KCl 10%) there was burning in each case with no appreciable difference.

*Test H.*—The composition was prepared as in Test G but with 5% KCl added with the same results in 10 runs as in Test G.

*Test I.*—The composition was prepared as in Test B but with 10% DAP. Immediately after addition of the DAP, 5% KCl was added. In 10 runs (5 AN controls and 5 AN+DAP 10%+KCl 5%) there resulted burning in the 5 controls. In the mixture tests one burned and 4 fumed.

*Test J.*—The composition was prepared as in Test B but with 10% $(NH_4)_2SO_4$ added in place of DAP. In 10 runs (5 AN controls and 5 AN+$(NH_4)_2SO_4$) there was burning in each case.

*Test K.*—The composition was prepared as in Test B but with 10% DAP to which was added 5% $(NH_4)_2SO_4$. The 5 AN controls all burned while the mixtures merely fumed.

*Test L.*—The composition was prepared by adding 10% KCl to an aqueous solution (6% $H_2O$) of AN. All samples, both controls and mixtures burned.

The integral admixture or co-crystallization of ammonium phosphate with ammonium nitrate in concentrations between 1 and 15% appears to have the valuable property of significantly reducing flammability and susceptibility to detonation of ammonium nitrate. The higher the concentration of these additives in the ammonium nitrate matrix within the range indicated, the greater their effect in reducing flammability and susceptibility to detonation. From the point of view of industrial practice, however, it would appear that it is not necessary to increase the mixture beyond 15% to reduce the flammability and detonability sufficiently for safety in all ordinary conditions of handling and storage. Further, the addition of diammonium phosphate to the ammonium nitrate is much more readily accomplished during its manufacture when the percentage added is below 15%.

It will be obvious to those skilled in the art that various changes may be made without departing from the spirit of the invention and therefore the invention is not limited to what is described in the specification but only as indicated in the appended claims.

What is claimed is:

1. A method for rendering fertilizer grade ammonium nitrate resistant to flame and insensitive to detonation which comprises adding to said fertilizer grade ammonium nitrate over 5% to and including 10% of a desensitized additive selected from the group consisting of ammonium phosphates and mixtures of at least 65% ammonium phosphates with no more than 35% potassium chloride or ammonium sulfate. the product being an integral, intimate and uniform mixture of the ingredients.

2. A fertilizer grade ammonium nitrate containing from 33–34% nitrogen content which is resistant to flame and insensitive to detonation consisting essentially of ammonium nitrate with over 5% to and including 10% of a desensitizing additive selected from the group consisting of ammonium phosphates and mixtures of at least 65% ammonium phosphates with no more than 35% potassium chloride or ammonium sulfate, the product being an integral, intimate and uniform mixture of the ingredients.

3. A fertilizer grade ammonium nitrate according to claim 1 wherein the product contains 90% ammonium nitrate and 10% ammonium phosphate.

References Cited

UNITED STATES PATENTS

| | | | |
|---|---|---|---|
| 2,657,977 | 11/1953 | Stengel et al. | 23—103 |
| 2,957,763 | 10/1960 | Barnes et al. | 71—64 |
| 3,171,716 | 3/1965 | Diekmann et al. | |

DONALD H. SYLVESTER, *Primary Examiner.*

T. D. KILEY, *Assistant Examiner.*